US009652541B1

(12) United States Patent
Amacker et al.

(10) Patent No.: US 9,652,541 B1
(45) Date of Patent: May 16, 2017

(54) IN-LINE EDITING OF SEARCH REFINEMENTS

(75) Inventors: Matthew W. Amacker, Santa Clara, CA (US); William F. Stasior, Los Altos, CA (US)

(73) Assignee: A9.com, Inc., Palo Alto, CA (US)

( * ) Notice: Subject to any disclaimer, the term of this patent is extended or adjusted under 35 U.S.C. 154(b) by 921 days.

(21) Appl. No.: 13/009,801

(22) Filed: Jan. 19, 2011

(51) Int. Cl.
*G06F 17/30* (2006.01)

(52) U.S. Cl.
CPC .. *G06F 17/30867* (2013.01); *G06F 17/30622* (2013.01)

(58) Field of Classification Search
CPC .... G06F 8/34; G06F 3/0481; G06F 17/30867; G06F 17/30622; G06F 3/048
USPC ......... 707/758, 765, 766, 767, 774, 999.005
See application file for complete search history.

(56) References Cited

U.S. PATENT DOCUMENTS

| | | | |
|---|---|---|---|
| 7,152,064 B2* | 12/2006 | Bourdoncle et al. | |
| 8,161,044 B2* | 4/2012 | Blackwell et al. | 707/731 |
| 8,209,314 B2* | 6/2012 | Blackwell | 707/706 |
| 8,214,345 B2* | 7/2012 | Torres et al. | 707/706 |
| 2006/0026145 A1* | 2/2006 | Beringer et al. | 707/3 |
| 2006/0242554 A1* | 10/2006 | Gerace et al. | 715/501.1 |
| 2007/0094241 A1* | 4/2007 | Blackwell | G06F 17/30864 |
| 2007/0106658 A1* | 5/2007 | Ferrari et al. | 707/5 |
| 2007/0156651 A1* | 7/2007 | Weigel et al. | 707/3 |
| 2007/0192694 A1* | 8/2007 | Allor et al. | 715/713 |
| 2008/0147638 A1* | 6/2008 | Hoeber et al. | 707/5 |
| 2009/0106241 A1* | 4/2009 | Blackwell | 707/5 |
| 2009/0119572 A1* | 5/2009 | Koivunen | 715/206 |
| 2009/0144513 A1* | 6/2009 | Pierce et al. | 711/159 |
| 2009/0187537 A1* | 7/2009 | Yachin et al. | 707/3 |
| 2010/0146012 A1* | 6/2010 | Beaudreau | G06F 17/30648 707/803 |
| 2011/0029563 A1* | 2/2011 | Coiera et al. | 707/779 |
| 2011/0093488 A1* | 4/2011 | Amacker | G06F 17/30873 707/767 |
| 2011/0106834 A1* | 5/2011 | Blackwell | G06F 17/30873 707/769 |

OTHER PUBLICATIONS

Nudelman, Greg. "Faceted Finding with Super-Powered Breadcrumbs". p. 1-25. Apr. 9, 2010. http://boxesandarrows.com/faceted-finding-with-super-powered-breadcrumbs/.*

(Continued)

*Primary Examiner* — Scott A Waldron
*Assistant Examiner* — Fatima Mina
(74) *Attorney, Agent, or Firm* — Hogan Lovells US LLP (57) ABSTRACT

An editable search refinement specification can be displayed with search results for a search query. The search refinement specification can include terms of the search query and any modifiers to the query, such as categories, filters, and other refinements. A user can edit portions of the search refinement specification inline, with other portions of the specification being retained, in order to adjust the search. Using such an approach, a user can adjust a search query without losing any context or refinement from a previous search that the user would like to use for the subsequent search. Various options can be provided with the search refinement specification, such as to edit any portion, delete one or more portions, suggest refinements, go to other specifications, and the like. The search refinement specifications also can be saved for use at a later time.

23 Claims, 5 Drawing Sheets

(56) References Cited

OTHER PUBLICATIONS

Johansson, Maria. "Combining Search and Browse—Integrated Facted Breadcrumbs." The Findability Blog, posted on Apr. 16, 2010. p. 1-2. http://www.findwise.com/blog/combining-search-and-browse-integrated-faceted-breadcrumbs/.*

K. Instone. Location, path and attribute breadcrumbs. In Proceedings of the 3rd Annual Information Architecture Summit, Mar. 16-17, 2002. http://keith.instone.org/breadcrumbs/. http://instone.org/files/KEI-Breadcrumbs-IAS.pdf.*

\* cited by examiner

IN-LINE EDITING OF SEARCH REFINEMENTS

BACKGROUND

As an ever-increasing amount of information is being stored electronically, there is a corresponding need to improve the ways in which users can search for this information. Various search engines exist that enable users to locate content or information by specifying a search query containing one or more keywords or other such terms. In many cases, search engines will enable users to search in specific categories and apply various filters to narrow the parameters of the search. While such approaches are useful in locating information, there currently is no quick and easy way to adjust a portion of those parameters. For example, a user wanting to change a search query typically will lose many of the filters or parameters associated with the prior search query, as parameters often do not apply to different terms so providers tend to simply remove those criteria for a new search. While such an approach can prevent a user from receiving too few results, the approach also requires the user to perform several navigation steps to re-apply all the filters or other parameters to the new search query. In other cases, a user might be able to go backwards one step at a time until the user gets to a place where the user would like to adjust the search, but such an approach is time consuming, does not necessarily make the process any easier, and can lose context over what was done previously.

BRIEF DESCRIPTION OF THE DRAWINGS

Various embodiments in accordance with the present disclosure will be described with reference to the drawings, in which:

FIGS. 2(*a*) and 2(*b*) illustrate an example interface enabling a user to search for content that can be used in accordance with various embodiments;

FIGS. 3(*a*) and 3(*b*) illustrate an example interface enabling a user to adjust portions of a breadcrumb to adjust a search in accordance with various embodiments;

FIGS. 4(*a*) and 4(*b*) illustrate an example interface enabling a user to modify aspects of a search breadcrumb and/or preview results for at least some of those modifications that can be used in accordance with various embodiments.

DETAILED DESCRIPTION

Systems and methods in accordance with various embodiments of the present disclosure may overcome one or more of the aforementioned and other deficiencies experienced in conventional approaches to searching for content in an electronic environment. In particular, various embodiments enable a user to modify aspects or parameters of a search "inline" in order to retain important or at least desirable aspects of a previous query. In many embodiments, a user is able to modify one or more portions of what is referred to herein as a search "breadcrumb." A breadcrumb, also referred to herein as a search refinement "specification," generally refers to a string, collection, or set of elements including at least one search term and at least one search refinement, where a refinement can be anything useful for modifying a search, such as a parameter range, category, filter, etc. Such a search refinement specification or breadcrumb in at least some embodiments is displayed as a type of path, wherein each step or "crumb" along the path corresponds to a parameter that was used to focus or adjust the search. For example, a path might include nodes of a hierarchical tree that the user navigated to get to a specific sub-category, filters that were to be applied to the search results, ranges or additional parameters of the search, etc. When such a breadcrumb is displayed in various embodiments, a user can edit at least portions of this breadcrumb inline, or at the point where the breadcrumb is displayed, in order to adjust one or more aspects of a search without losing context, adjustments, parameters, or any other relevant portions of the previous search.

In one example, a user enters or otherwise specifies a search query. Upon the user selecting a refinement to the search query, such as by selecting a specific category or range of values, for example, a search refinement specification or breadcrumb can be displayed along with the search results. The breadcrumb can display the terms of the query used for the search, as well as information for each refinement that is currently being applied. The breadcrumb can be editable inline, such that the user can adjust or remove any of the refinements or search terms, and can add new refinements or terms without losing any of the other information in the breadcrumb that is of interest to the user. For each change in at least some embodiments, the user can receive updated search results matching the updated breadcrumb.

The portions or elements of a breadcrumb can be selected and/or modified in a number of different ways. In some embodiments, at least one search option element is displayed that enables a user to select different types of adjustment for each element, such as to edit or remove a given element. In some embodiments, a user can select an item of content to be used as an example, wherein aspects, categories, and/or terms associated with that item can be added to the breadcrumb, or used to adjust one or more aspects of the breadcrumb. The user can have the option of scrolling through breadcrumbs or saving breadcrumbs for future use.

Various other functions and advantages are described and suggested below as may be provided in accordance with the various embodiments.

Figure 1:
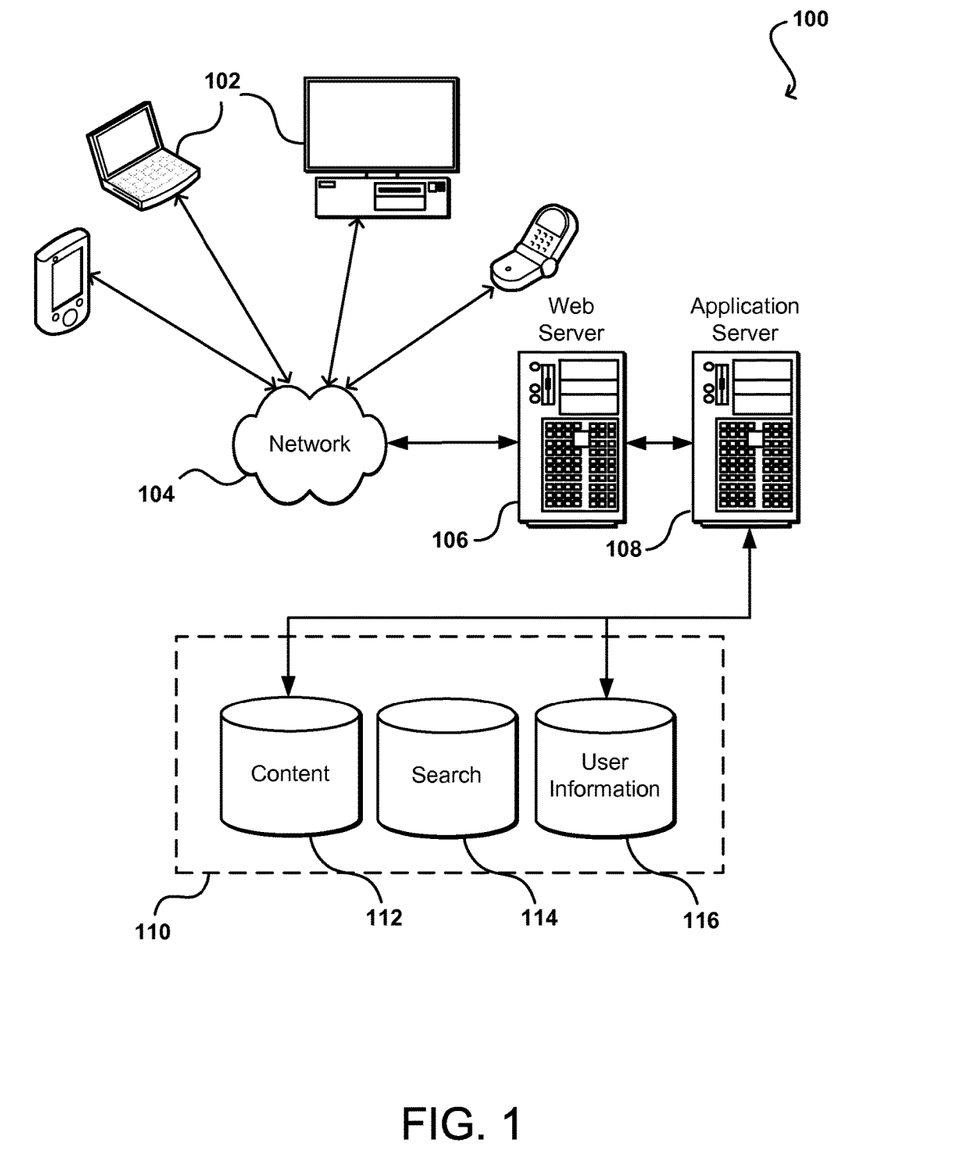
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The data stores of the data plane 110 can include several separate data tables, databases, or other data storage mechanisms and media for storing data relating to a particular aspect. For example, the data plane illustrated includes mechanisms for storing content (e.g., images, video, or production data) 112 and user information 116, which can be used to determine and serve content. The data plane also is shown to include a mechanism for storing search data 114, such as may include not only indexes and similar information for searching, but also information such as past search queries, popular breadcrumbs, and other such information. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2A:
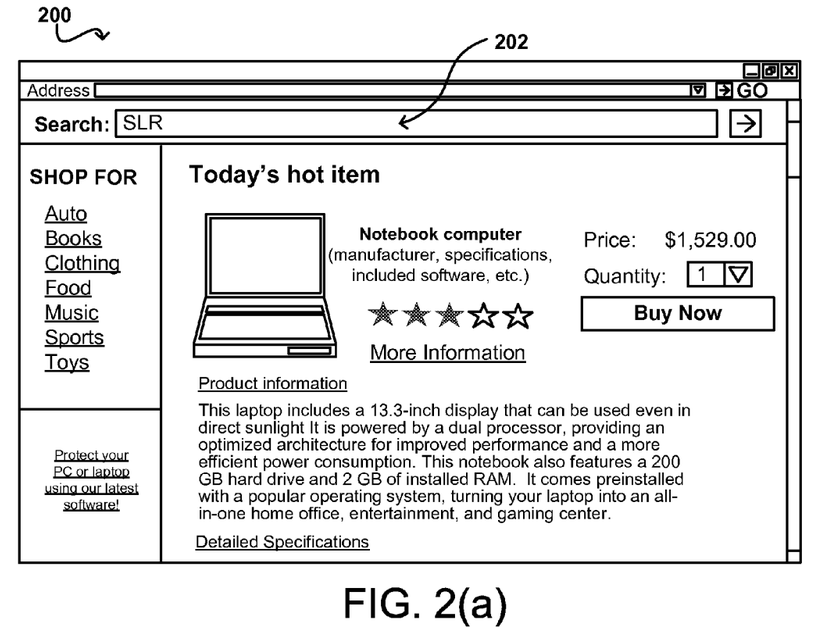

An environment such as that described with respect to FIG. 1 can be used to enable users to search for and locate various types of content, where content can include any appropriate type of electronic information such as data, images, files, audio, video, etc. As known in the art, such an environment might utilize a search engine or search service to enable users to search for, locate, and retrieve content using one or more search terms as part of a search query. A query can be compared against a search index, for example, in order to find results that match at least a portion of the search query. For example, FIG. 2(*a*) illustrates an example interface page 200 for a user accessing a Web site or similar display of content. As illustrated, the page can include any appropriate content, such as advertising, categories, product information, etc. In this example, the page relates to items (e.g., products or services) offered for consumption (e.g., purchase, rent, lease, stream, or download) through an electronic marketplace. While a user can browse the site using links or other navigational elements to attempt to locate content of interest, a user often will utilize a search option 202 in order to more quickly narrow to content of interest. In this example, the user is looking for digital SLR cameras, and has entered the term "SLR" as a search query into a search box. It should be understood that any approach for inputting or selecting one or more search terms can be utilized as well within the scope of the various embodiments.

Figure 2B:
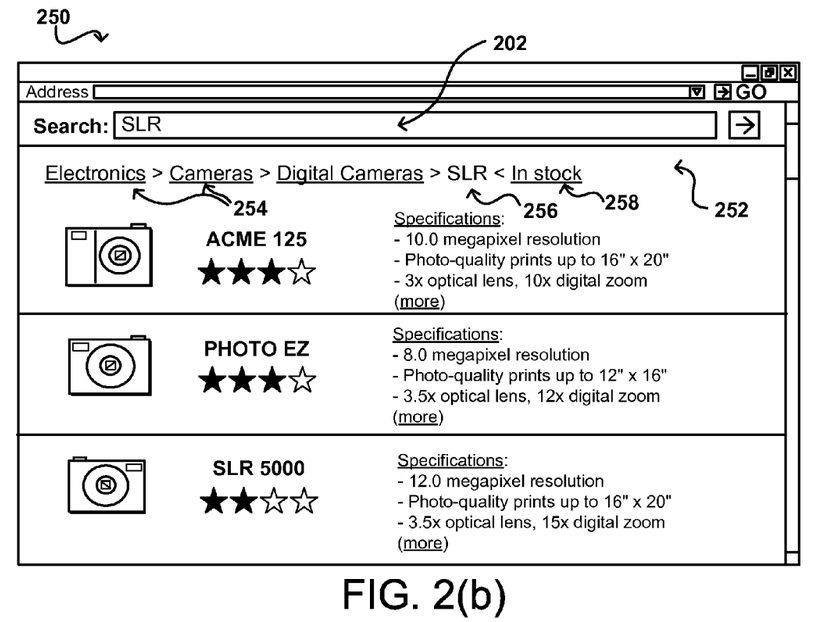

FIG. 2(*b*) illustrates an example of a search results page 250 wherein a plurality of search results are displayed to the user that have been determined to match the search query according to one or more appropriate matching criteria. Approaches for locating content and search results based on submission of a search query are well known in the art and will not be discussed herein in detail. On this example page 250, a search refinement specification 252 is displayed along with the search results. The search refinement specification in this example includes, from left to right, a path down a hierarchical categorization tree to a current sub-category. In FIG. 2(*b*), the highest level category or node is an "electronics" category. The user might have first received results in this category, then narrowed the results by selecting a "cameras" sub-category and then a "digital cameras" sub-category, such as by selecting category links as displayed in FIG. 2(a). This "path" through the categorization hierarchy is displayed through the search breadcrumb, with each category 254 along the path from the top-level category to the current sub-category being displayed to the user in this example, although other portions or selections can be used in other embodiments. Each category in this breadcrumb is listed separately, with each parent category being separated from a next-lower level child category by a ">" symbol to indicate the relationship between categories, although any other appropriate separator can be used as well.

In this example, the terms of the search query 256 are listed adjacent to the lowest level category 258 in the breadcrumb 252. The terms displayed can correspond to the search query exactly as entered by the user, as modified for searching by a search service or system, or using any other such approach. For example, the user might enter a query such as "The story of KING KONG." The query displayed thus might be "The story of KING KONG" as entered by the user, or might be some other form such as "story king kong," which might represent the actual query that was used to search for results after applying processes known in the art such as stemming, removal of stop words, lower case adjustments, etc. In this example, the search query also appears in the search box 202, such that the user can quickly make adjustments or modifications without having to re-enter the query.

The search breadcrumb can also include any other modifiers, filters, or adjustments applied to the search query to locate and/or display specific types of results. In this example, any such modifiers are displayed to the right of the search term. Here, a modifier 258 indicating that results should only (or preferably) represent "in stock" items has been added to the search breadcrumb. The modifiers are added to the right of the search term, to clearly differentiate the modifiers from the category hierarchy. Further, the separators used for the modifiers can signify differences as well. As mentioned, the modifiers can include any appropriate search modifiers, such as filters (e.g., shoe sizes) or parameter ranges (e.g., items with prices between $5 and $25). Modifiers also can relate to ways in which the user prefers to display the results. For example, the user might want to view items that are sorted from lowest to highest price, and from shortest shipping time to longest shipping time, etc. While these terms do not affect the search per se, they can affect the display of the search results and it can be desirable for the user to retain these parameter values for other searches without having to re-enter that information. Any other appropriate modifiers can be used as well within the scope of the various embodiments.

As discussed, search breadcrumbs such as that illustrated in FIG. 2(b) can provide useful information for a user, as the user can view various levels of a search hierarchy, and become familiar with those levels, which can help with future searches. Further, if the user wants to jump up to a higher level in the hierarchy, the user can select the link (or another such element) associated with that level, category, or node of the hierarchy in order to move to that level. In breadcrumbs where the path is not necessarily listed in hierarchical order, but follows a path of refinements or other such order, the user still can have the ability to move to results for a prior selection or other such step of the breadcrumb. A downside to simply selecting on one of those links using conventional approaches, however, is that much of the other information in the breadcrumb might be lost. For example, selecting the "cameras" node in the breadcrumb 252 of FIG. 2(b) might cause the user to obtain search results in the cameras category. Unfortunately, as discussed above, such approaches typically result in much of the other information in the breadcrumb being lost. For example, selecting the "cameras" category in the breadcrumb might not only cause the "digital cameras" subcategory to be removed, but also might cause the search term "SLR" to be removed, as well as the modifier "in stock". Thus, selecting on the "cameras" link would end up in the user effectively starting a new search in the "cameras" subcategory.

As discussed, however, many users would like to be able to maintain some or all of the relevant information in the breadcrumb, in order to obtain results of interest without having to redo previous work, such as specifying ranges, entering search queries, etc. In the example above, the user might have entered a term such as "SLR" with a modifier such as "in stock" and navigated to a sub-category such as "digital cameras." If the user did not receive a sufficient number of results, or did not find the camera for which the user was searching, the user might want to back out to the broader category (e.g., cameras) to attempt to find the camera of interest. The search query and modifier might still apply, so it would be desirable for the user to be able to keep that information and just change the category in which content is being searched. Similarly, the user might determine that the search is being executed in the appropriate sub-category, but might attempt to focus the search results by modifying the search term. Even though the search query is changed, the user might desire to keep the modifiers and category information in the search breadcrumb, such that only the search term portion of the query will change.

Figure 3A:
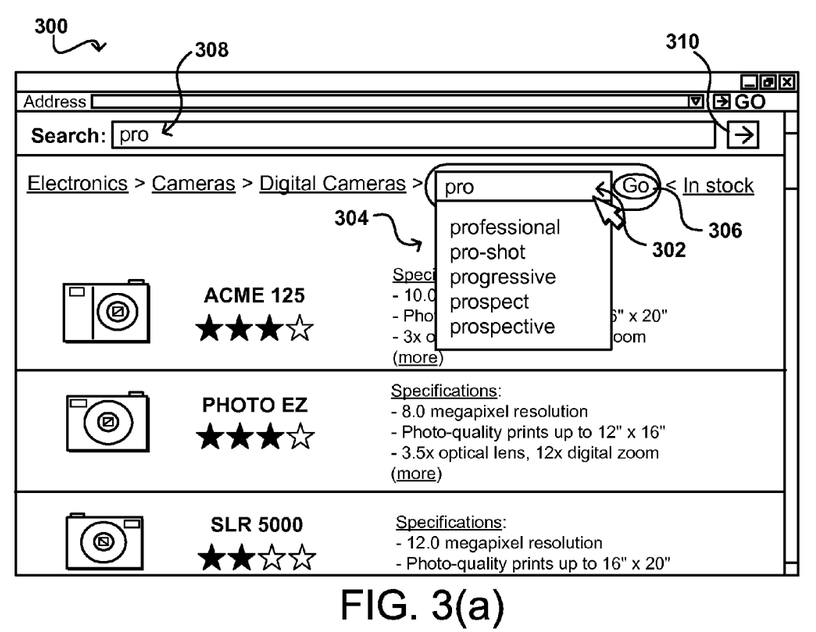

Approaches in accordance with various embodiments provide users with the ability to modify specific portions of a search breadcrumb inline, without losing relevant information from the existing breadcrumb. For example, FIG. 3(a) illustrates an example interface page 300 wherein a user is able to modify the search term within the breadcrumb itself, while still maintaining the other portions of the breadcrumb. In this example, the user is able to select the search term portion of the breadcrumb by mousing over, clicking on, or otherwise selecting that portion of the breadcrumb. This example page brings up a text input box 302 to enable a user to modify the existing term(s). In some embodiments the box 302 will initially display the current search term(s), in case the user wants to modify the existing query, while in other embodiments the search might be empty or have other information. In this example, the page also has an auto-complete function, such that as the user enters or modifies the term(s) in the search box 302, the interface can display suggestions for completing the search term(s) in a drop-down box 304 or other such element. In some embodiments, the search system or service can look at terms associated with that sub-category and/or terms associated with items in that sub-category to determine terms to suggest as part of the auto-completion. As known for such elements, the user can select an element from the suggestions to fill in the search box 302. The user can continue to modify the term(s) until the user is satisfied, at which time the user can select a "go" 306 or similar option that will cause the system to search for and display results for the new term(s) using the information maintained for the breadcrumb. It should be understood that various other options for entering text and selecting the breadcrumb settings for search can be used as well within the scope of the various embodiments.

In this example, it can be seen that modifying the search term(s) in the breadcrumb also causes the search query entered into the search box 308 to be updated as well. In cases where the user wants to start a new search for the new term(s) without maintaining the information in the breadcrumb, the user can have the option of entering the new term in the search box instead of the breadcrumb and selecting a general search option 310, which can cause a new search to be executed that discards the other information in the breadcrumb.

Figure 3B:
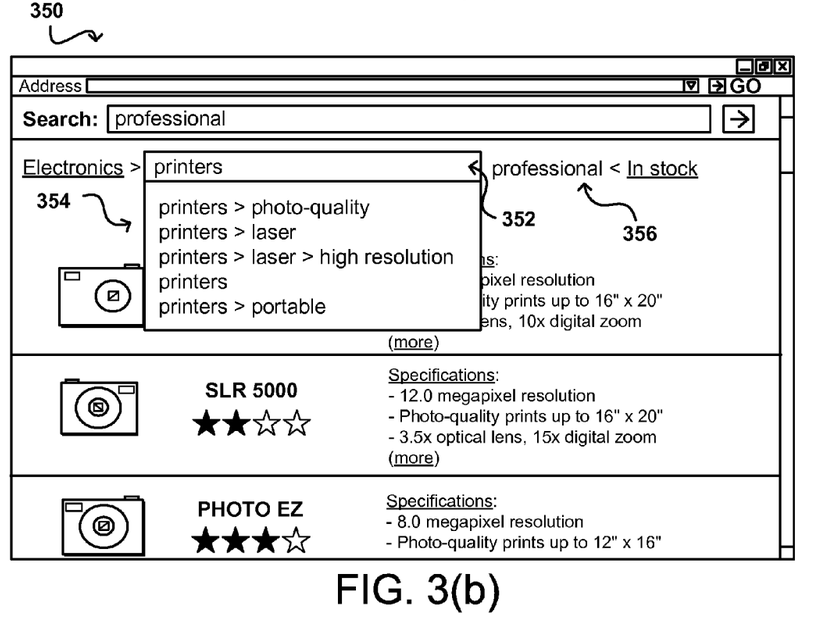

The user can have the ability to change other information for a breadcrumb inline as well. For example, FIG. 3(*b*) illustrates an example interface page 350 wherein the results have been updated for the new term "professional" 356. In this example, the user decides to also modify the search breadcrumb to look in another sub-category. The user is able to, using an approach similar to those described above for the search term, select a different category to search at any level of the breadcrumb. In this example, the user selected the category "cameras" to modify. Although drop-down boxes with options or other such elements can be utilized, in this example another text box 352 is displayed that enables a user to search for a particular category. An auto-complete function can be used here as well, which can suggest not only a completion for the current category, but can also recommend sub-categories based on any appropriate factor(s), such as the search term 356, user history, frequency of selection, etc.

Further, the system can determine whether prior sub-categories (or other refinements) make sense, and if not can remove the sub-categories and/or make suggestions for new sub-categories. For example, there might not be a sub-category "digital cameras" under the category "printers" 354, such that the system can automatically remove "digital cameras" from the breadcrumb and suggest other sub-categories. The user then can select any of these sub-categories, or can search in the category entered by the user (here, printers 354). In other embodiments, the system might leave the sub-categories in the breadcrumb even if they no longer make sense, but turn those options red or otherwise adjust the appearance of those terms in order to prompt the user to remove those terms or otherwise adjust something about the breadcrumb. In some embodiments, the breadcrumb can include a number for each term that indicates the number of search results for that level of the breadcrumb, such that the user can remove or adjust terms that result in little or no search results.

In some situations where more than one element of the refinement specification is affected by a proposed change, or where the elements may no longer represent an optimal combination, the system can suggest one or more alternate breadcrumbs to use in locating information. For example, the user might be looking in a "kids>electronics" sub-category, and specify modifiers such as "over 50 inches" and "high definition" when looking for televisions. Since such modifiers might not make much sense in a "kids" category, the system can provide at least one alternate breadcrumb, such as may include the sub-category "electronics>HDTV". In other embodiments where the user changes to a "kids" category while looking for televisions, the system might suggest breadcrumbs with other modifiers that might make more sense, such as "anti-tip," "under $300," or "portable."

In some embodiments, elements and/or entire breadcrumbs can be suggested based at least in part upon breadcrumbs stored for, or followed by, other users. These users can include, for example, friends or connections in a social network. In some embodiments, a user might link to certain other users to obtain suggestions from those other users, such as friends or co-workers. In some cases, users can shop together in a session and push or receive suggestions to the other user. In some cases, a user might link to an expert in a field to obtain suggestions. For example, a specific person might be very knowledgeable about certain types of information, and the user might associate his or her account with this person in order to get suggestions based on the behavior or activities of that person. For example, there could be new types of products or technologies that the user might not know about, which could be suggested as a modifier or sub-category, for example, based on similar breadcrumbs stored for, or navigated by, the selected person.

Figure 4A:
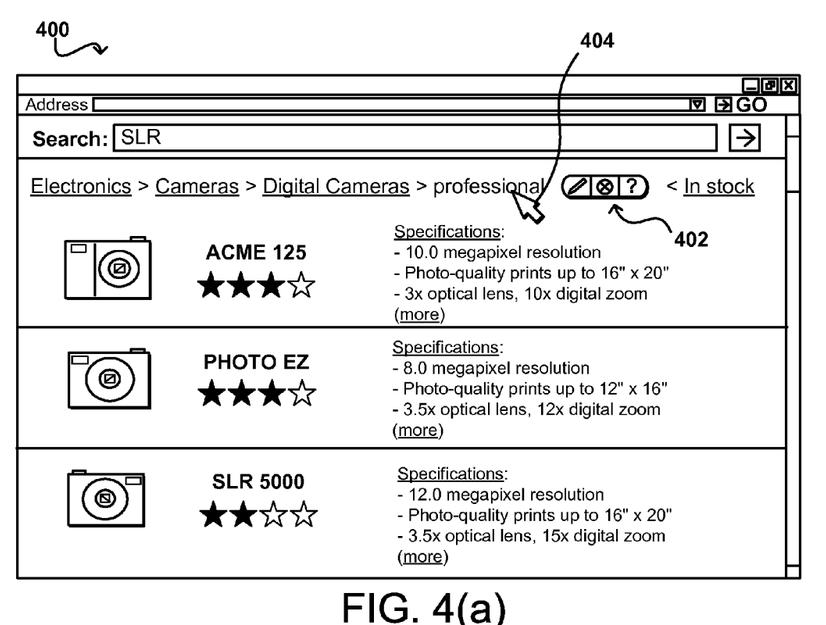

In some situations, the user might want to perform different actions at different times. For example, a user might want to edit a search term, delete that search term in another instance, start a new search for a term without the breadcrumb information, or any other such action. Accordingly, approaches in accordance with various embodiments provide users with options to assist in modifying a breadcrumb. For example, the example interface page 400 of FIG. 4(*a*) illustrates a search option element 402 that can provide various options to a user in response to various actions. In this example, the user has moved a mouse cursor 404 over the search term in the breadcrumb, although any other appropriate selection action can be used as well in the various embodiments. Performing such an action causes the search option element 402 to appear for that term. The option element can include any appropriate number of options, which can vary depending upon the relevant term or modifier being modified, user preferences, or other such information.

In this example, the search option element 402 includes a first selectable portion (illustrated by a pencil icon) that enables the user to edit the existing term while maintaining the rest of the breadcrumb. A second selectable portion (illustrated by a cross out icon) enables the user to delete that term from the breadcrumb while maintaining the other relevant portions. A third selectable portion (illustrated by the question mark) enables the user to obtain help about using the breadcrumb or other such information. Various other options can be provided as well. For example, the user can receive an option to save the current breadcrumb, go back to an earlier breadcrumb, load a different breadcrumb, preview results, get suggestions for completing the breadcrumb, share the breadcrumb with another user or post to a social network, etc. In some embodiments, the user can select the buttons or options to be presented, which can be stored as preference information with a user profile or other such information.

Figure 4B:
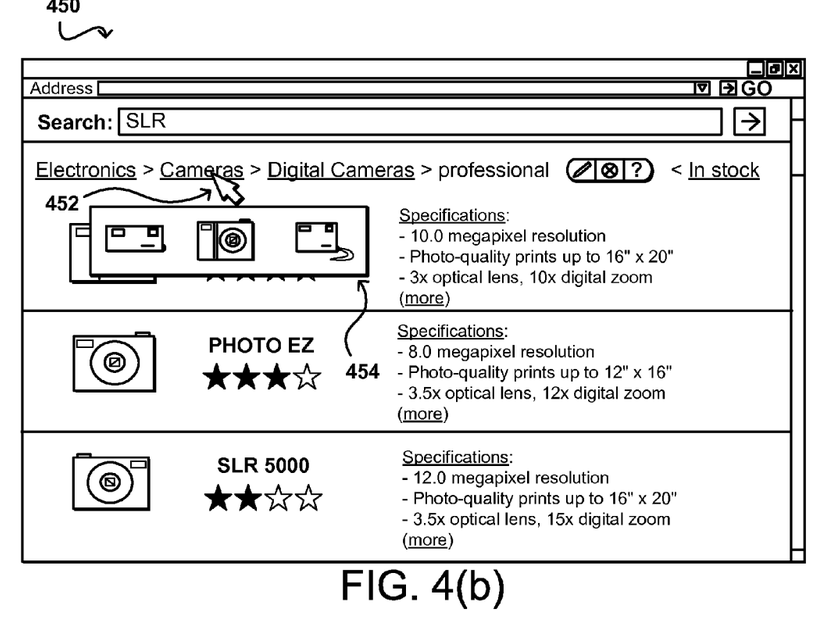

Various other options can be presented with a breadcrumb as well. For example, FIG. 4(*b*) illustrates an example interface page 450 wherein a user is able to preview search results for specific options before modifying the breadcrumb. In FIG. 4(*b*), the user is able to obtain results for at least some levels of the breadcrumb by mousing over a portion of the breadcrumb. In this example, the user mouses over the category "cameras" 452 to see the items that would be displayed as "results" 454 were the user to move to that category via the breadcrumb. For example, the user might not receive enough search results, or accurate search results, using the current sub-category, and might want to determine the appropriate level in the hierarchy to receive those results. By previewing the results at each level, the user can quickly determine an appropriate level, and then can modify the breadcrumb using approaches discussed elsewhere herein to move to that level.

Figure 5:
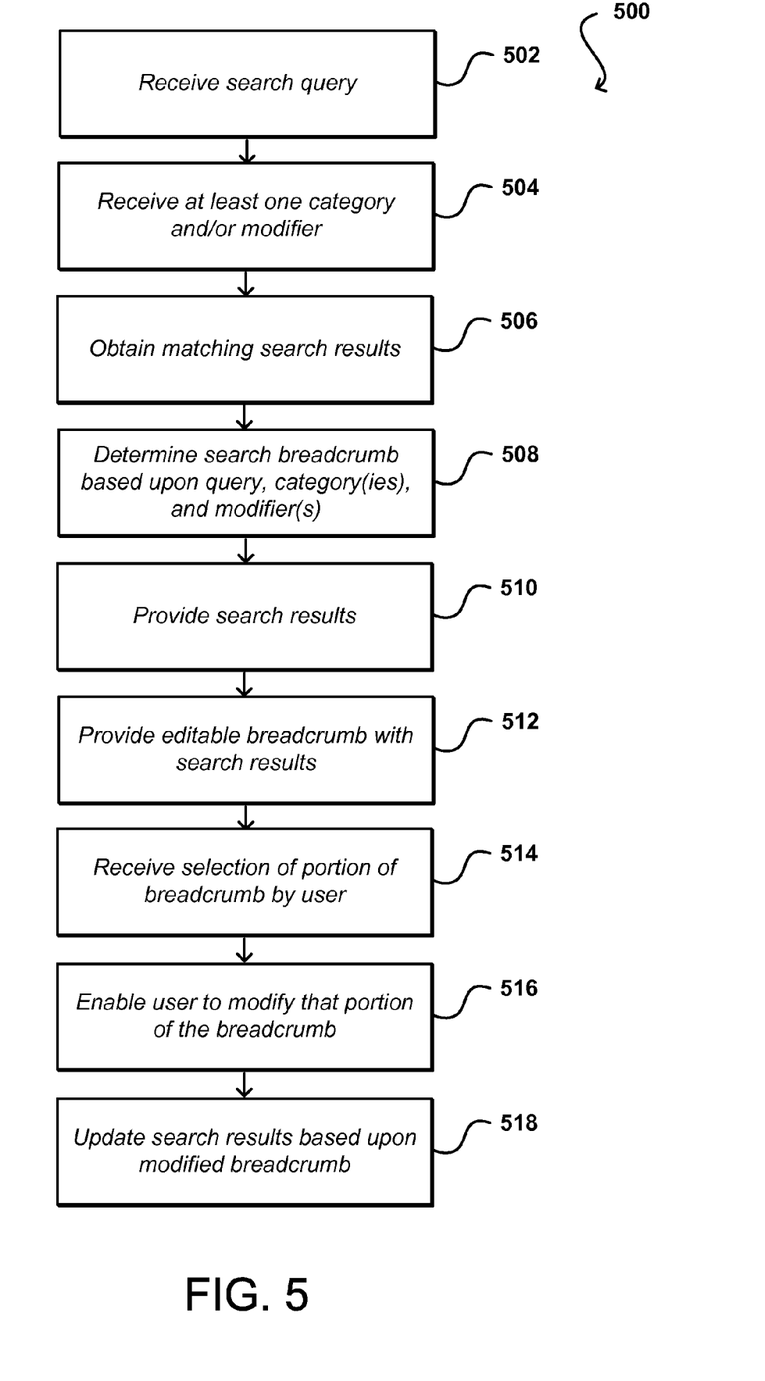
FIG. 5 illustrates an example of a process for enabling a user to edit a search breadcrumb inline that can be utilized in accordance with various embodiments.

FIG. 5 illustrates an example process 500 for enabling a user to modify a search breadcrumb inline, which can be used in accordance with various embodiments. It should be understood that there can be additional, fewer, or alternative steps performed in similar or alternative orders, or in parallel, within the scope of the various embodiments unless otherwise stated. In this example, a search query is received from a user 502, such as by a user entering one or more keywords into a search engine or search page, which causes a request to be sent from a client device to a search system or service. As part of the same request, or as part of one or more subsequent requests, at least one category or search modifier can be received from the user 504. As discussed above, such requests can be submitted in response to a user navigating to a particular category or sub-category, specifying a particular range of values, specifying one or more search modifiers (e.g., size, brand, or color), a sort order, or other such information. The search query and any modifying information can be used to obtain matching search results 506, such as by executing the modified query against at least one search index. Approaches for locating search results that match a query are well known in the art and will not be discussed in detail herein. In addition to obtaining matching search results, a search breadcrumb can be determined 508 that is based at least in part upon at least a portion of the search query, any category or location information, modifiers, or other such information. The search results then can be provided for display to the user 510, such as part of a search results page, and an editable version of the determined breadcrumb can be provided with the search results 512, such as on a separate portion of the search results page.

If the user wishes to modify the search but retain at least some of the modifiers that were applied to the previous search, the user can select a portion of the breadcrumb to modify, which can result in a selection of a portion of the breadcrumb being received 514. In response to the request, the user can be enabled to modify at least that portion of the breadcrumb 516. In some embodiments, the request and the ability to modify the breadcrumb will happen on the client device, such as through active script on the client, while in other embodiments the request and response will be sent across a network, such as to a remote server. Once the user has modified the breadcrumb, updated search results can be obtained and provided to the user 518. The user also can have displayed a current version of the updated breadcrumb. In some embodiments, a new page of results will be rendered for display, while in other embodiments the results displayed on the same page will be updated. Various other options can be utilized as well in accordance with other embodiments.

In at least some embodiments, a user also can have the option of saving breadcrumbs for subsequent use. For example, a user might generate a breadcrumb that points to a particular category that is of interest to the user, with ranges or other modifiers that the user prefers. By saving these breadcrumbs, the user can retrieve the breadcrumbs at a later time to retrieve similar results, obtain information about the newest items in that sub-category with the desired attributes, etc. A user can also have the option of sharing a breadcrumb with others in order to direct those users to specific results, a type of results, etc. In some embodiments, a user will appreciate the ability to maintain a path to a particular category without having to remember and re-navigate the content refinement hierarchy. For example, a user looking to buy new tennis shoes might have a breadcrumb saved that includes not only the specific sub-category of shoes that the user likes, but also information such as size, color, price, and the like. The ability to save breadcrumbs can potentially be used to provide a search template, whereby users can quickly select and obtain specific types of results based on saved breadcrumb information.

In some embodiments, a user can generate or update a breadcrumb automatically based upon specific products or information. For example, a user might be in a category and locate an item that is similar to the type of item for which the user is looking. Instead of trying to navigate through various categories and/or refinements to find more of that type of item, the user can "drag and drop" or otherwise cause that item to be associated with a breadcrumb area or element. Such an action can cause the information in the breadcrumb to be updated with information similar to that for the selected item. For example, the user might search in a category such as "electronics" and locate a digital camera in which the user is interested. By dragging and dropping that camera on the breadcrumb, the breadcrumb can be updated with information related to that digital camera. In some embodiments, the breadcrumb will be updated with category information first, such as to narrow to a "cameras>digital cameras" sub-category. If the user wishes to further narrow the search, the user can drag and drop the item again, which can narrow to specific parameters, such as similar cost, features, etc. In other embodiments, the user can be displayed several options when dropping the item on the breadcrumb, and can select from those items. For example, options such as similar cost, features, manufacturer, and other such values can be selectable by the user. In other embodiments, a search option element or other selectable element of the breadcrumb can enable a user to effectively narrow or broaden the search refinement. For example, if the user drags a digital camera on the breadcrumb, the system might narrow to a digital camera category. If the user wants results that are more like the digital camera selected, the user can select a "focus" or "narrow" option, for example, which can add other aspects of the selected camera, such as to show cameras with similar features. The user can continue to focus the search until the displayed results are sufficiently similar to the selected camera. If the user narrows the search too far, the user can have the option of broadening the search back out using a similar process.

If the user narrows to a set of results, and sees another result that is of the type for which the user is searching, the user can drop that other result on the breadcrumb as well to narrow or adjust the search to display results more like that item, and adjust the breadcrumb accordingly. In some embodiments, when the user drops a new item on the breadcrumb, the user can be prompted to indicate whether the information for the new item should be added to the existing breadcrumb, or replace information for a previously dropped item. For example, a user might want to see items that have features of both cameras, and thus might drop two cameras on the breadcrumb in order to find results that have features of both. In other instances, the user might want to look for cameras similar to the second selection instead of the first selection, without having to lose the other information in the breadcrumb, and thus can effectively "swap out" the camera to adjust the breadcrumb. In some instances, the user can switch back and forth between results for the two cameras, such as by scrolling through the breadcrumbs. In some embodiments, a user can obtain a "split screen" or similar view wherein the user can compare results from different breadcrumbs, etc. Various other such approaches can be used as well.

As discussed, in some embodiments the breadcrumb and search results can be provided at least in part using an active script (e.g., JavaScript) executing on the client device. In some embodiments, a library, script, or other such element can be stored on the client device, which can be loaded by code (e.g., HTML) on any appropriate page. The active script can enable the user to modify the breadcrumb, and cause search results to be updated in response to the modification. In some embodiments, the search results (or at least a count of the search results) can be updated in real time, such as for each character entered or option selected via the breadcrumb. In other embodiments, the functionality can be coded into each page, such as into the HTML for each search page, wherein the code can be transmitted with each page. In some embodiments, changing the breadcrumb causes a page address (e.g., URL) to be updated (e.g., the strings changed) such that the underlying search engine or system does not need to be updated in order to implement this functionality, and can just execute the search as if the user entered those search criteria initially. Various other functionalities (e.g., flash elements or hidden modules) can be used to provide at least portions of such functionality as well.

In some embodiments, the script (or the search service, etc.) can access other types of information to attempt to adjust the results. For example, the script might access preference or behavior information for the user to add specific refinements to the breadcrumb. In other embodiments, the system might look to preferences or behavior information for similar users to attempt to adjust the breadcrumb. Such functionality can be done automatically, or upon the user selecting an option that will attempt to adjust the breadcrumb to find results that are most likely to be of interest to the user. For example, a user might have certain taste in music, which can be used to suggest categories or modifiers. The user also might own a specific brand of video game console, and any video game searches might automatically be modified to show results for that brand of console. Various other alternatives can be utilized as well, as would be apparent to one of ordinary skill in the art in light of the teachings and suggestions contained herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of refining a search query, comprising:
    receiving a search request from a client device, the search request including a query term and a selected search category from a hierarchical search categorization;
    providing a first set of search results corresponding to the query term and the selected search category to be displayed on the client device;
    providing an editable search refinement specification including a plurality of editable elements to be displayed along with the first set of search results, the plurality of editable elements including a first editable element, a second editable element, and a third editable element corresponding to each parent category of the selected search category in the hierarchical search categorization, each of the first editable element, the second editable element, and the third editable element being associated with text and a respective text input box element;
    providing a displayable option element utilized to modify a currently selected editable element of the plurality of editable elements and to be displayed along with the plurality of editable elements, the displayable option element including two or more of a set of selectable operation icons including an edit operation icon, a remove operation icon, an undo operation icon, a save operation icon, a share operation icon, an auto-complete operation icon, a help operation icon, and a suggestion operation icon;
    receiving an input to independently modify the text of the first editable element of the editable search refinement specification via the respective text input box element without modifying the second editable element and the third element of the editable search refinement specification; and
    in response to receiving the input to modify the text of the first editable element of the editable search refinement specification via the respective text input box element, providing a second set of search results corresponding to the modified first editable element, the second editable element, and the third editable element of the editable search refinement specification to be displayed on the client device.

2. The computer-implemented method of claim 1, wherein the search request or a subsequent request includes an additional search refinement parameter, the editable search refinement specification being updated to include at least a fourth element for the additional search refinement parameter.

3. The computer-implemented method of claim 2, wherein the user is further able to modify the additional search refinement parameter of the hierarchical search categorization without losing or modifying other information in the editable search refinement specification.

4. The computer-implemented method of claim 1, wherein the user is able to remove at least one of the plurality of the editable elements from the editable search refinement specification.

5. A computer-implemented method of refining a search query, comprising:
    receiving a search request from a client device, the search request including at least a first query term and at least a first search refinement value;
    providing a first set of search results corresponding to the first query term and the first search refinement value to be displayed on the client device;
    providing an editable search refinement specification including a plurality of editable elements to be displayed along with the first set of search results, the plurality of editable elements including at least a first editable element corresponding to the first query term and at least a second editable element corresponding to the first search refinement value, each of the plurality of editable elements being associated with text and a respective text input box element, each of the plurality of editable elements enabling a user to adjust the text of at least one editable element of the plurality of editable elements of the editable search refinement specification via the respective text input box element while maintaining the text of at least one other editable element of the plurality of editable elements of the editable search refinement specification;
    providing a displayable option element utilized to modify a currently selected editable element of the plurality of editable elements and to be displayed along with the plurality of editable elements, the displayable option element including two or more of a set of selectable operation icons including an edit operation icon, a remove operation icon, an undo operation icon, a save operation icon, a share operation icon, an auto-complete operation icon, a help operation icon, and a suggestion operation icon;
    receiving a submission including at least a second query term and at least a second search refinement value taken from the editable search refinement specification after adjustment of the text of at least one editable element of the editable search refinement specification via the respective text input box element; and
    providing a second set of search results matching the second query term and the second search refinement value in the editable search refinement specification after the adjustment to be displayed on the client device.

6. The computer-implemented method of claim 5, wherein each of the first search refinement value and the second search refinement value includes at least one of a value range, sort order, type of content, parameter value, or search category.

7. The computer-implemented method of claim 5, further comprising:
in response to the adjustment of the text of at least one editable element of the editable search refinement specification and before providing for display the second set of search results, providing at least one alternative suggested search refinement specification selected based at least in part upon an aspect of the adjustment.

8. The computer-implemented method of claim 5, wherein content being searched is organized according to a hierarchical categorization, the editable search refinement specification displaying a current search category and at least one parent category in the hierarchical categorization.

9. The computer-implemented method of claim 8, further comprising removing or adjusting any category displayed in the editable search refinement specification in response to a user input.

10. The computer-implemented method of claim 5, further comprising searching for another category within an editable element displaying a category in the editable search refinement specification in response to a user input.

11. The computer-implemented method of claim 5, further comprising providing preview results for at least one adjustment of a respective editable element of the plurality of editable elements of the editable search refinement specification before submitting the editable search refinement specification as a search query.

12. The computer-implemented method of claim 5, further comprising, during adjustment of the text of an editable element of the editable search refinement specification, suggesting a value to be inserted into the editable element.

13. The computer-implemented method of claim 12, wherein the value suggested is based upon at least one of item information, category information, related searches, user preferences, user behavior, and related user information.

14. The computer-implemented method of claim 5, further comprising
saving a version of the editable search refinement specification as a search template in response to a user input.

15. The computer-implemented method of claim 14, further comprising
sharing a version of the editable search refinement specification with at least one other user.

16. The computer-implemented method of claim 5, further comprising:
in response to the adjustment of the text of the at least one editable element of the editable search refinement specification and before providing for display the second set of search results, automatically modifying at least another editable element of the editable search refinement specification based at least in part upon an aspect of the adjustment.

17. A system for refining a search query, comprising:
a processor; and
a memory device including instructions that, when executed by the processor, cause the system to:
receive a search request from a client device, the search request including at least a first query term and at least a first search refinement value;
provide a first set of search results corresponding to the first query term and the first search refinement value to be displayed on the client device;
provide an editable search refinement specification including a plurality of editable elements to be displayed along with the first set of search results, the plurality of editable elements including at least a first editable element corresponding to the first query term and at least a second editable element corresponding to the first search refinement value, each of the plurality of editable elements being associated with text and a respective text input box element, each of the plurality of editable elements allowing an adjustment of the text of at least one editable element of the plurality of editable elements of the editable search refinement specification via the respective text input box element while maintaining the text of at least one other editable element of the plurality of editable elements of the editable search refinement specification;
provide a displayable option element utilized to modify a currently selected editable element of the plurality of editable elements and to be displayed along with the plurality of editable elements, the displayable option element including two or more of a set of selectable operation icons including an edit operation icon, a remove operation icon, an undo operation icon, a save operation icon, a share operation icon, an auto-complete operation icon, a help operation icon, and a suggestion operation icon;
receive a submission including at least a second query term and at least a second search refinement value taken from the editable search refinement specification after adjustment of the text of at least one editable element of the editable search refinement specification via the respective text input box element; and
provide a second set of search results matching the second query term and the second search refinement value in the editable search refinement specification after the adjustment to be displayed on the client device.

18. The system of claim 17, wherein content being searched is organized according to a hierarchical categorization, the editable search refinement specification displaying a current search category and at least one parent category in the hierarchical categorization.

19. The system of claim 18, wherein the instructions when executed further cause the system to detect an input to remove or adjust any category displayed in the editable search refinement specification and to search for another category within an editable element displaying a category in the editable search refinement specification.

20. The system of claim 17, wherein the instructions when executed further cause the system to detect an input to preview results for any adjustments or editable elements of the editable search refinement specification before submitting the editable search refinement specification.

21. The system of claim 17, further comprising:
in response to the adjustment of the text of the at least one editable element of the editable search refinement specification and before providing for display the second set of search results, automatically modify at least another editable element of the editable search refinement specification based at least in part upon an aspect of the adjustment.

22. A non-transitory computer-readable storage medium storing instructions for refining a search query, the instructions when executed by a processor causing the processor to:
receive a search request from a client device, the search request including at least a first query term and at least a first search refinement value;

provide a first set of search results corresponding to the first query term and the first search refinement value to be displayed on the client device;

provide an editable search refinement specification including a plurality of editable elements to be displayed along with the first set of search results, the plurality of editable elements including at least a first editable element corresponding to the first query term and at least a second editable element corresponding to the first search refinement value, each of the plurality of editable elements being associated with text and a respective text input box element, each of the plurality of editable elements allowing an adjustment of the text of at least one editable element of the plurality of editable elements of the editable search refinement specification via the respective text input box element while maintaining the text of at least one other editable element of the plurality of editable elements of the editable search refinement specification;

provide a displayable option element utilized to modify a currently selected editable element of the plurality of editable elements and to be displayed along with the plurality of editable elements, the displayable option element including two or more of a set of selectable operation icons including an edit operation icon, a remove operation icon, an undo operation icon, a save operation icon, a share operation icon, an auto-complete operation icon, a help operation icon, and a suggestion operation icon;

receive a submission including at least a second query term and at least a second search refinement value taken from the editable search refinement specification after adjustment of the text of at least one editable element of the editable search refinement specification via the respective text input box element; and provide a second set of search results matching the second query term and the second search refinement value in the editable search refinement specification after the adjustment to be displayed on the client device.

23. The non-transitory computer-readable storage medium of claim 22, wherein content being searched is organized according to a hierarchical categorization, the editable search refinement specification displaying a current search category and at least one parent category in the hierarchical categorization.

* * * * *